United States Patent [19]

Cox et al.

[11] Patent Number: 5,007,318
[45] Date of Patent: Apr. 16, 1991

[54] METAL STRIP EDGE TRIMMING APPARATUS

[75] Inventors: Laurence C. Cox, Portage; Raymond Dugan; Daniel D. Evans, both of Chesteron; Robert Griffith, Hamlet; Terry L. Handley, Westville; Jeffrey J. Leeper, Valparaiso, all of Ind.

[73] Assignee: National Steel Corporation, Pittsburgh, Pa.

[21] Appl. No.: 453,599

[22] Filed: Dec. 20, 1989

[51] Int. Cl.⁵ .............................................. B23D 25/12
[52] U.S. Cl. .................................... 83/425.2; 83/422; 83/430; 83/500; 83/501; 83/659; 83/434
[58] Field of Search ................. 83/422, 425.2, 426, 83/430, 446, 500, 501, 502, 503, 659, 434, 436

[56] References Cited

U.S. PATENT DOCUMENTS

| | | | |
|---|---|---|---|
| 801,916 | 10/1905 | Rudolphi | 83/430 |
| 1,904,005 | 4/1933 | Masset | 83/446 |
| 2,710,062 | 6/1955 | Lanstrom | 83/446 |
| 3,110,208 | 11/1963 | Mitchell Jr. et al. | 83/302 |
| 3,183,748 | 5/1965 | Wilshin et al. | 83/446 |
| 3,662,638 | 5/1972 | Fries et al. | 83/367 |
| 3,718,022 | 2/1973 | McClain et al. | 72/132 |
| 3,731,600 | 5/1973 | Earp | 83/659 |
| 4,168,643 | 9/1979 | Takimoto et al. | 83/422 |
| 4,263,827 | 4/1981 | Pontarollo | 83/482 |
| 4,492,135 | 1/1985 | Ginn et al. | 83/155 |

Primary Examiner—Douglas D. Watts
Assistant Examiner—Allan M. Schrock
Attorney, Agent, or Firm—James L. Bean

[57] ABSTRACT

An edge trimmer for trimming the side edges of a running length of metal strip having upper and lower rotary shearing cutter discs engaging the top and bottom respectively, of the strip being trimmer includes top and bottom cylindrical strip stabilizers mounted coaxially with the cutter discs engaging the top and bottom surface of the strip adjacent the trim line, and a movable holddown roll disposed inboard of the top strip stabilizer and cooperating with the lower strip stabilizer to stabilize the strip at a location spaced inward from the trim line. The holddown roll is movable between an operable position engaging the strip and an inoperable position permitting access to the cutter disc for servicing.

8 Claims, 2 Drawing Sheets

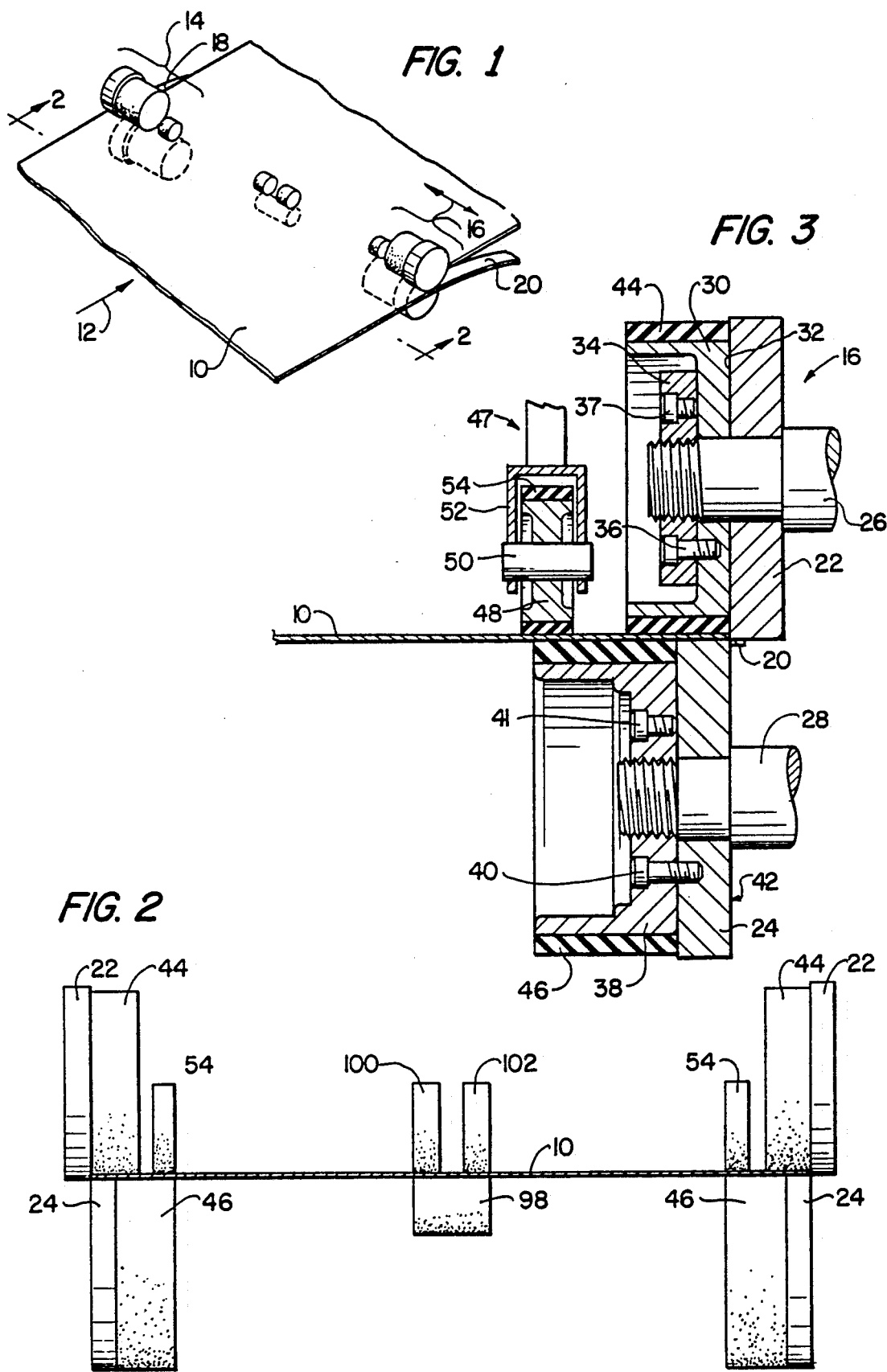

METAL STRIP EDGE TRIMMING APPARATUS

BACKGROUND OF THE INVENTION

1. Field of the Invention

This invention relates to edge trimming of metal strip, and more particularly to an improved apparatus for trimming the side edges of a running length of metal strip.

2. Description of the Prior Art

In the production of metal strip, it is conventional practice to roll the strip from a slab or ingot to a width slightly greater than desired for the finished product. After rolling, the strip is edge trimmed along each side to produce the desired strip width and remove any edge defects and irregularities, and to produce uniformly smooth parallel side edges. While the metal ribbon trimmed from each side edge is chopped into short lengths and recycled as scrap, it nevertheless represents a very substantial expense.

Although edge trimming is necessary, for economic reasons, it is desired to trim as little material as practical from the strip. While modern rolling mill practice makes it possible to roll strip to a width near that desired for the finished product, it has generally been considered necessary to trim a ribbon from the side edges which is wider than required to produce the desired parallel edges and to remove edge irregularities and defects. The reason for this is that, in most high speed side trimming operations, it generally has not been considered possible to adequately stabilize the edges of the running length of strip to simultaneously trim very narrow ribbons from both sides of the strip.

The edge trimming of metal strip is conventionally performed by pairs of cooperating disc or wheel-type shearing cutters which may also be equipped with chopping devices for chopping the trimmed ribbon into short lengths of scrap as disclosed, for example, in U.S. Pat. No. 3,110,208. As mentioned in this prior art patent, the rotary shearing cutters tend to cause a transverse bow in the metal strip between the oppositely disposed pairs of cutting shears and it has been proposed to use top and bottom stabilizing guides in contact with the strip. This bowing tendency is not always uniform and can cause distortion in the edge of the strip, producing a ripple-like surface at the edge and an uneven width for the trimmed strip.

It has been proposed to use a stabilizing donut mounted adjacent to and rotating with the rotary shear cutters in a metal strip slitting operation as shown, for example, in U.S. Pat. No. 4,492,135. In the stabilizing device of this patent, a metal tire is urged into contact with the strip surface by a resilient ring supported for rotation with the rotary cutters.

The use of rotary shearing cutters in a high speed edge trimming operation for trimming sheet steel produces rapid wear and dulling of the rotary cutters, with the result that the cutters require frequent adjustment and periodic replacement. Such adjustment or replacement can only be accomplished when the edge trimmer is out of operation and since the edge trimmer is normally operated in conjunction with other strip processing steps such as a pickling and coating line, it is important that such adjustment and/or replacement of the cutters be accomplished in a minimum of time. The prior art trimming devices employing rigid holddown guides presented serious obstacles to cutter changing and also required substantial time for adjustment when adjusting the apparatus for processing strip of different widths.

Accordingly, it is an object of the present invention to provide an improved edge trimming apparatus for accurately severing an edge trim ribbon of minimum width from the edges of metal strip.

Another object is to provide such an edge trimming apparatus including rotary strip stabilizing means which provides improved strip stability and eliminates or minimizes transverse strip bowing and edge buckling and distortion during the trimming operation.

Another object is to provide such a strip edge trimming apparatus which is mounted for movement with the rotary cutters for adjusting the apparatus to trim strips of different widths.

Another object is to provide such an edge trimming apparatus which facilitates cutter adjustment and/or cutter changing to thereby minimize down time for the apparatus.

SUMMARY OF THE INVENTION

The foregoing and other features and advantages of the invention are achieved in an edge trimming apparatus employing rotary trimming shears mounted on a carrier at each side of the strip processing line, with the carriers being supported for movement transversely of the strip to enable adjustment of the apparatus for edge trimming of strips of various widths. The trimming shears employ a pair of disc-like shearing cutters (cutter discs) mounted for rotation about spaced parallel axes one above and one below the horizontal plane of the metal strip. The cutter discs have faces disposed in overlying, contiguous relationship along the trim line of the strip fed therebetween, and each rotary cutter disc has mounted on its inwardly directed face a substantially cylindrical inwardly directed stabilizing sleeve for rotation with the cutter disc in overlying, contacting relation with the edge portion of a strip being trimmed.

The axial length of the cylindrical stabilizing ring carried on the upper or outboard cutter disc is sufficient to overlie the peripheral edge of the inboard or lower cutter disc and preferably also a portion of the stabilizing ring mounted on the lower cutter disc. The stabilizing ring carried on the lower cutter disc has an axial length sufficient to extend axially inward past the upper stabilizing ring in underlying relation to the strip and cooperates with a holddown roller engaging the top surface of the strip for applying pressure to a strip moving therebetween.

The holddown roll is carried on one end of an elongated arm pivotably mounted for movement about an axis transverse to the strip and is resiliently biased into engagement with the top of the strip by suitable means such as a fluid cylinder. The holddown roll and its supporting and actuating mechanism are mounted for movement transversely of the strip with the adjacent trimming shears and is releasably supported for pivotal movement to a retracted or non-operative position to provide access to the cutter discs.

Pressure applied by the holddown roller to the strip passing through the nip of the holddown roller and the lower stabilizing ring stabilizes the moving strip along a line spaced inboard from its side edge, with the portion of the strip between the side edge and the holddown roll being guided and stabilized by the first and second stabilizing rings and the outer peripheral surface of the lower cutter disc, making it possible to edge trim a more narrow trimmed ribbon from the strip while substantially eliminating transverse strip bowing and edge buckling during the trimming operation.

BRIEF DESCRIPTION OF THE DRAWINGS

The foregoing and other features and advantages of the invention will be apparent from the detailed description contained hereinbelow, taken in conjunction with the drawings, in which:

FIG. 1 is an isometric view schematically illustrating the improved edge trimmer of the present invention employed to edge trim a moving steel strip;

FIG. 2 is an enlarged sectional view taken on line 2—2 of FIG. 1;

FIG. 3—3 is a further enlarged fragmentary sectional view showing a portion of the trimmer mechanism used on one side of the strip;

DESCRIPTION OF THE PREFERRED EMBODIMENT

Figure 5:
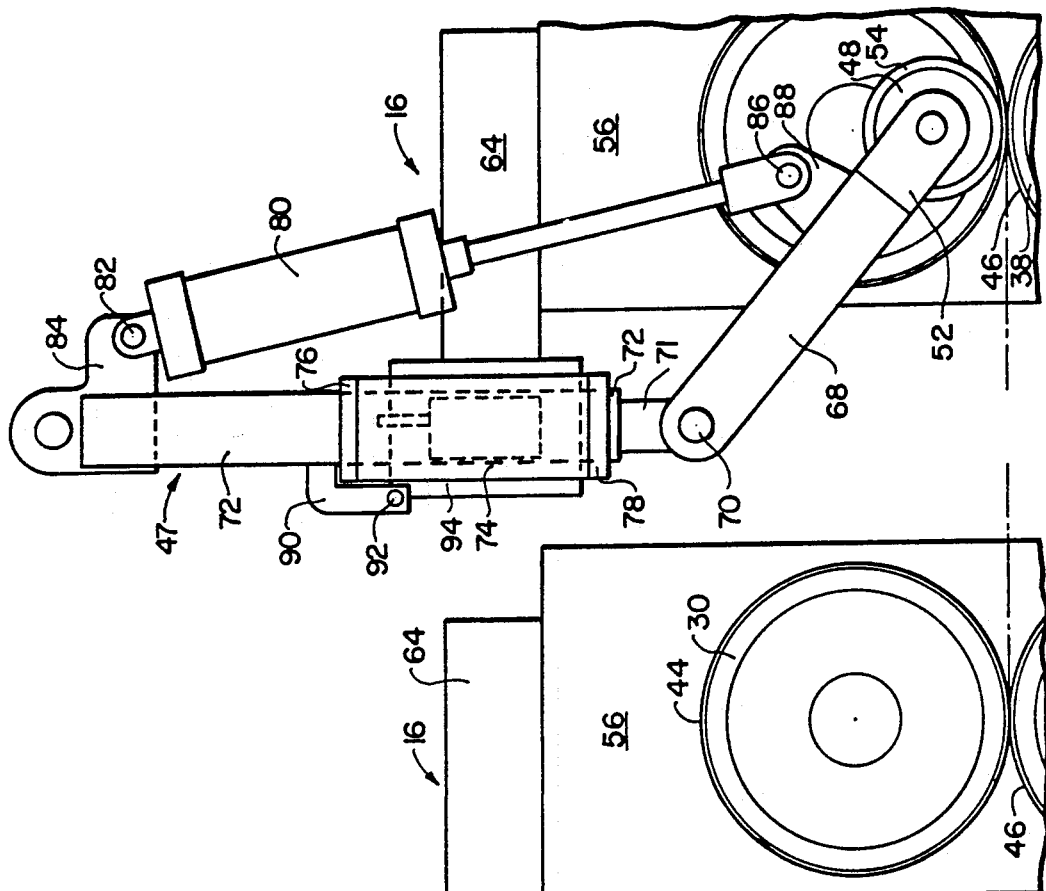
FIG. 5 is an enlarged fragmentary side elevation view of a portion of the structure shown in FIG. 4.

Referring now to the drawings in detail, an improved edge trimming apparatus according to the present invention is illustrated schematically in FIG. 1 wherein a section of a rolled steel strip 10 moving in the direction of arrow 12 is shown having its side edges trimmed by a pair of rotary edge trimming devices 14, 16 to remove trim ribbons 18, 20, respectively, from its side edges. Trimming devices 14 and 16 are identical and accordingly only trimming device 16 will be described in detail herein, it being understood that the description also applies to trimming device 14.

Referring first to FIG. 3, it is seen that the trimming device 16 comprises upper and lower disc-like rotary shearing cutters 22, 24 supported for rotation about parallel horizontal axes extending above and below, respectively, the horizontal plane of the metal strip 10. The upper cutter disc 22 is supported for rotation on the end of a shaft 26 driven by a suitable motor, not shown, and lower cutter disc 24 is similarly supported on a second shaft 28. A stabilizing ring support hub 30 is mounted on shaft 26 in contact with the inwardly directed shearing face of upper cutter disc 22 and a locking nut 34 fitted onto the end of shaft 26 retains the cutter disc and hub on the shaft. Tap screws 36 and a lock bolt 37 may be employed to lock the nut 34 to the stabilizing ring support hub 30.

A second stabilizing ring support hub 38 is threaded onto the end of cutter shaft 28, and tap screws 40 and a lock bolt 41 are provided to lock hub 38 to lower cutter disc 24 so that the hub 38 and disc 24 may be removed from shaft 28 as an assembled unit for resurfacing the outwardly directed cutter face 42 of disc 24.

As seen in FIGS. 2 and 3, the outwardly directed shearing face 42 of bottom cutter disc 24 lies in a vertical plane which is substantially coplanar with the inwardly directed shearing face 32 of cutter disc 22, with faces 32 and 42 preferably overlapping slightly to provide complete severing of the trim ribbon from the metal sheet being trimmed in a manner known in the art. This trimming operation results in wear and dulling of the cutting edge defined by the intersection of the shearing face and outer cylindrical surface of the cutter discs, making it necessary to remove the discs from the shafts for refinishing of the shearing faces at frequent intervals. Shearing face 42 of the lower cutter disc may be refinished with the hub 38 mounted thereon while hub 30 must be separated from cutter disc 22 for refinishing of face 32 and the mounting arrangement shown facilitates removal, refinishing and handling of the cutter disc for this purpose.

A cylindrical annular sleeve 44 of wear resistance synthetic resin material, for example 90 durometer urethane, is mounted on and bonded to the outer surface of support hub 30 for rotation with cutter disc 22. The radius of the outer cylindrical surface of sleeve 44 is less than that of disc 22, with the difference preferably being slightly less than the thickness of the strip 10 to be trimmed plus the extent of overlap of faces 32 and 42.

A second synthetic resin cylindrical sleeve 46 similar to sleeve 44 is mounted on and bonded to the outer cylindrical surface of hub 38 for rotation therewith, with the outer radius of sleeve 46 being substantially equal to the radius of cutter disc 24 so that the outer cylindrical surface of disc 24 and sleeve 38 forms a substantially continuous cylindrical surface in rolling contact with the bottom surface of strip 10 adjacent the edge to be trimmed.

As most clearly seen in FIGS. 2 and 3, sleeve 46 and its supporting hub 38 project axially inward, i.e., toward the centerline of the strip 10, farther than sleeve 44 and its supporting hub 30. Thus, sleeve 44 overlies the outer cylindrical surface of cutter disc 24 and a portion only of sleeve 46 with the space therebetween being substantially equal to or preferably slightly less than the thickness of strip 10 to stabilize the outer edge portion of a strip being processed through the trimming device.

A holddown roll assembly 47 cooperates with sleeve 46 to apply pressure to strip 10 at a location inboard of sleeve 44. The roll assembly 47 includes an idler roll 48 mounted for rotation on a horizontal shaft 50 which, in turn, is supported by a bracket 52 above the top surface of strip 10. A third synthetic resin sleeve 54, preferably of the same material as sleeves 44 and 46, is supported on the outer cylindrical surface of holddown roll 48 for engaging the top surface of strip 10 in opposition to sleeve 46. During operation of the trimming device to trim a metal strip, roll 48 is continuously urged into engagement with the top surface of strip 10 to apply a positive pressure in the nip between sleeves 54 and 46 to stabilize the strip at a position inboard from the trim line.

Figure 6:
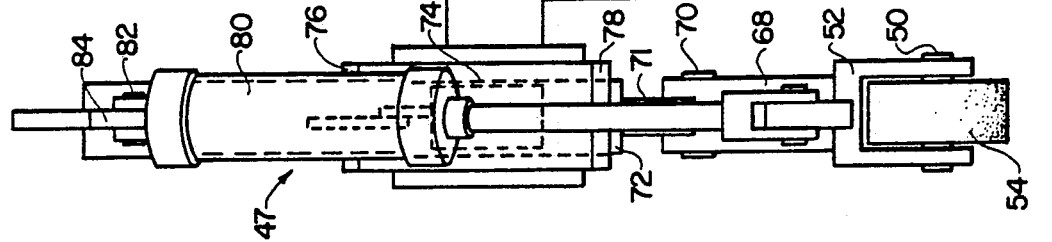
FIG. 6 is a view similar to FIG. 5 showing a portion of the structure in an alternate position.
Figure 4:
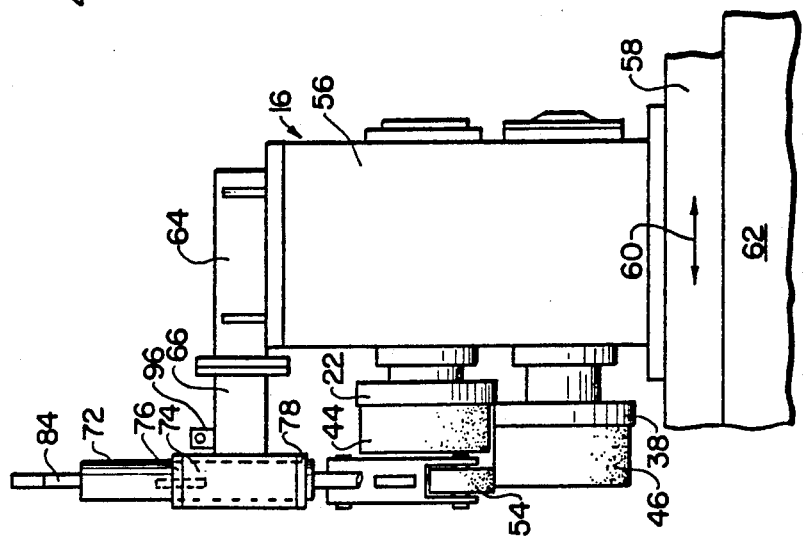
FIG. 4 is an elevation view of the edge trimmer and holddown mechanism used on one side of the strip.

Referring to FIGS. 4-6, it is seen that the edge trimming device 16 includes a rigid box-like housing 56 mounted on a base 58 for movement transversely of the strip pass line toward and away from the edge trimming device 14 as indicated by arrow 60. Base 58 is supported on a rigid mill frame member 62, and suitable means such as jack screws, not shown, are provided for accurately positioning the trimming device and for rigidly retaining the device in the desired adjusted position to trim strip to the desired width. A bracket 64 mounted on top of housing 56 supports a laterally extending cantilevered arm 66 for mounting the holddown roll assembly 47. As most clearly seen in FIG. 5, roll supporting bracket 52 is carried on one end of an arm 68 having its other end pivotably mounted, as by pin 70, on the downwardly projecting end portion 71 of a vertical support column 72. Column 72 in turn is supported for rotation about its vertical axis within a cylindrical sleeve 74 and is retained against axial movement in the sleeve by a pair of collars 76, 78. A linear fluid actuator 80 has its cylinder end pivotably connected, as by pin 82 and bracket 84, to the upwardly projecting end of support column 72 and its rod end pivotably connected, as by pin 86 and bracket 88, to the holddown wheel support arm 68 intermediate its ends. As best seen in FIG. 5, fluid actuator 80 may be extended to pivot arm 68 about pin 70 to resiliently urge the resilient sleeve 54 on holddown roll 48 to apply pressure in opposition to the sleeve 46 on cutter disc 38 to thereby firmly stabilize a strip passing through the device.

The holddown roll assembly 47 may be moved from the operative trimming position shown in FIG. 5 to the inoperative position shown in FIG. 6 to provide access to the upper cutter disc for removal and replacement or for servicing. The holddown assembly is retained in the operative position of FIG. 5 by an angle bracket 90 rigidly welded to the support column 72 and projecting downwardly along side sleeve 74 for releasable attachment, by suitable means such as a pin or bolt 92 extending through openings in the bracket 90 and in the vertically extending plate member 94 on arm 66. When it is desired to move the holddown roll assembly to the inoperative position of FIG. 6, actuator 80 is retracted to lift the holddown roll and bolt 92 is removed, permitting the assembly to be easily swung about the vertical axis of column 72. The assembly may be releasably retained in the inoperative position by a retaining bracket 96 positioned to receive the bolt 92 for clamping to the bracket 90.

While the strip trimming apparatus as described above is effective in accurately side trimming metal strip, it has been found to be advantageous to further stabilize a strip intermediate the two edge trimming devices when trimming wider stock material. This may be accomplished, as schematically illustrated in FIGS. 1 and 2, by providing a fixed stabilizing roll 98 beneath the strip pass line in position to contact the bottom surface of a strip being trimmed to provide vertical support at a position along the centerline of the strip. A pair of opposing holddown rolls 100, 102, are then provided above the strip and supported by an actuating mechanism which may be of the type described hereinabove with respect to holddown rolls 48, to apply a rolling pressure to the center portion of the strip. Stabilizing roll 98 and holddown rolls 100, 102 preferably have a resilient sleeve covering their outer surface. Using two top rolls 100, 102 which rotate independently avoids the phenomenon of "top roll cone shape wear" encountered when only a single large top roll is used. This results in a more effective holddown action.

It is apparent from the above description that the strip is stabilized under rolling pressure applied by the holddown rolls at a position spaced inwardly from the trim line of the trimmer to prevent bowing or buckling of the strip during the shearing operation. The strip is also stabilized outboard of the holddown roll by the stabilizing ring or sleeve 44 in cooperation with the opposing cutter disc peripheral surface and resilient surface of sleeve 46. This improved strip edge stabilizing system, alone or in combination with the central stabilizing roll structure, enables a more accurate positioning of the strip and produces a more uniform edge trim. The strip stability also makes it possible to trim a more narrow edge ribbon, thereby producing a higher yield and reducing cost for the product.

While a preferred embodiment of the invention has been described in detail, it should be apparent that the invention is not so limited and it is intended to include all embodiments which would be apparent to one skilled in the art and which come within the spirit and scope of the invention.

What is claimed is:

1. For use in an edge trimming operation for trimming the opposite marginal side edges of a running length of metal strip, a pair of edge trimmers positioned one adjacent each side edge of the strip, said edge trimmers each comprising an upper cutter disc mounted above the plane of the strip and a lower cutter disc mounted below the plane of the strip, said upper and lower cutter discs being mounted for rotation about spaced parallel horizontal axes extending transversely of the strip and cooperating to receive and trim the strip along a trim line extending closely adjacent one marginal edge of the strip, the improvement wherein each said edge trimmer further comprises, first strip edge stabilizing means mounted for coaxial rotation with said lower cutter disc, said lower cutter disc having a cylindrical outer surface and said first strip edge stabilizing means having a cylindrical outer surface extending inward from and forming an extension of the cylindrical surface of said lower cutter disc in contact with the bottom surface of a strip to be trimmed, second strip edge stabilizing means mounted for coaxial rotation with said upper cutter disc, said second strip edge stabilizing means having a cylindrical outer surface extending inward from said top cutter disc and contacting the top surface of the strip adjacent said trim line in opposition to said lower cutter disc and a portion of said first stabilizing means, said first stabilizing means extending inwardly from said trim line a distance greater than said second stabilizing means, and movable holddown roll means mounted for rotation about an axis parallel to the axis of said upper and lower cutter discs and contacting the top surface of a strip in opposition to said first stabilizing means at a location of said second stabilizing means.

2. The invention defined in claim 1 wherein the outer cylindrical surface of said first and said second stabilizing means and said holddown roll comprises a resilient synthetic resin material.

3. The invention defined in claim 1 wherein said holddown roll means includes mounting means supporting the holddown roll means for pivotal movement to a non-use position spaced from said cutter disc to permit access to the cutter disc for servicing.

4. The invention defined in claim 3 wherein said holddown roll means comprises a holddown roll having a cylindrical outer surface, an elongated arm supporting said holddown roll for rotation about a horizontal roll axis adjacent one end of the arm, pivot means supporting the other end of said arm for pivotal movement about a first pivot axis parallel to said roll axis and a second pivot axis extending transversely of and spaced from said roll axis, and retaining means releasably retaining said arm against pivotal movement about said second pivot axis during the trimming operation.

5. The invention defined in claim 4 further comprising power means for urging said arm in a direction to apply pressure through said holddown roll to the top surface of a strip during the trimming operation.

6. The invention defined in claim 5 wherein said second stabilizing means overlies the cylindrical peripheral surface of said lower cutter disc and cooperates therewith to stabilize the strip edge adjacent the trim line during a trimming operation.

7. The invention defined in claim 6 wherein said upper and said lower cutter discs and said holddown roll means are supported for movement as a unit transversely of a strip being trimmed to thereby produce trimmed strip of different widths.

8. The invention defined in claim 7 further comprising a stabilizing roll mounted below a strip being trimmed in position to engage the strip bottom surface at a location between said pair of edge trimmers, and a movable holddown roll positioned above the strip in position to cooperate with said stabilizing roll to stabilize the strip at a location intermediate said pair of trimmers.

* * * * *

UNITED STATES PATENT AND TRADEMARK OFFICE
CERTIFICATE OF CORRECTION

PATENT NO. : 5,007,318

DATED : April 16, 1991

INVENTOR(S) : Laurence C. Cox et al

It is certified that error appears in the above-identified patent and that said Letters Patent is hereby corrected as shown below:

On the title page, item [57] Abstract:

line 4, delete "trimmer" and insert --trimmed--

In the Claims:

Claim 1, line 42, after "location", insert --inboard--.

Signed and Sealed this

Twenty-fifth Day of August, 1992

Attest:

DOUGLAS B. COMER

*Attesting Officer*    *Acting Commissioner of Patents and Trademarks*